US011260459B2

(12) United States Patent
Scheibel et al.

(10) Patent No.: US 11,260,459 B2
(45) Date of Patent: Mar. 1, 2022

(54) TOOLS AND METHODS FOR FORMING ALIGNED HOLES FROM NEAR FULL-SIZED HOLES

(71) Applicant: The Boeing Company, Chicago, IL (US)

(72) Inventors: John P. Scheibel, Florissant, MO (US); James L. Scherer, Hazelwood, MO (US); Michael A. Ward, University City, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/864,058

(22) Filed: Apr. 30, 2020

(65) Prior Publication Data

US 2021/0339322 A1    Nov. 4, 2021

(51) Int. Cl.
*B23B 51/00* (2006.01)

(52) U.S. Cl.
CPC ....... *B23B 51/009* (2013.01); *Y10T 408/9065* (2015.01)

(58) Field of Classification Search
CPC ............ B23B 51/0054; B23B 51/0063; B23B 51/0426; Y10T 408/9065
See application file for complete search history.

(56) References Cited

U.S. PATENT DOCUMENTS 2,334,845 A * 11/1943 Schwartz ............ B23B 51/0063
408/224
2,555,746 A * 6/1951 Horsky ................. B23B 51/009
408/59

(Continued)

FOREIGN PATENT DOCUMENTS

| DE | 4315101 A1 | * | 11/1994 | ............. B23B 51/02 |
| DE | 19856395 A1 | * | 6/2000 | ............. B23B 51/00 |
| DE | 202013102140 U1 | * | 6/2013 | ........... B23B 51/009 |
| DE | 102013210112 A1 | * | 12/2014 | ........... B23B 51/009 |

(Continued)

OTHER PUBLICATIONS

Intellectual Property Office United Kingdom; Combined Search and Examination Report for Application No. GB105786.4 dated Oct. 20, 2021.
Intellectual Property Office United Kingdom; Combined Search and Examination Report for Application No. GB2107376.2 dated Nov. 19, 2021.

*Primary Examiner* — Eric A. Gates
(74) *Attorney, Agent, or Firm* — Parsons Behle & Latimer (57) ABSTRACT

Tools and methods for creating a plurality of aligned holes from a plurality of near full-sized holes. The tool includes a cutting member having a first diameter and a pilot member connected to and coaxial with the cutting member. A first section of the pilot member includes a centering member and is positioned between the cutting member and the second section having a second diameter. The centering member may include a cutting surface. The second diameter corresponds to a positional tolerance of misalignment of a plurality of near full-sized holes of the same diameter and a full-size hole diameter. The centering member may have a third diameter between the first and second diameters. The centering member may be tapered. The pilot member may be inserted into a plurality of near-full sized holes and the cutting member may cut through the holes to form a plurality of aligned full sized holes.

20 Claims, 7 Drawing Sheets

(56) References Cited

U.S. PATENT DOCUMENTS

| | | | | |
|---|---|---|---|---|
| 3,575,520 | A * | 4/1971 | Halpern | B23B 51/08 |
| | | | | 408/191 |
| 4,560,309 | A | 12/1985 | Hornsby | |
| 4,799,834 | A * | 1/1989 | Wells | B23B 27/141 |
| | | | | 407/42 |
| 4,815,902 | A * | 3/1989 | Durfee, Jr. | B23B 51/108 |
| | | | | 408/225 |
| 5,909,985 | A * | 6/1999 | Shiga | B23B 51/0009 |
| | | | | 408/1 R |
| 6,511,267 | B2 * | 1/2003 | Slaughter | B23B 51/009 |
| | | | | 408/1 R |
| 8,602,698 | B2 * | 12/2013 | Craig | B23C 3/02 |
| | | | | 409/132 |
| 9,180,530 | B2 * | 11/2015 | Gey | B23C 5/18 |
| 9,434,009 | B2 * | 9/2016 | Kakimoto | B23B 51/009 |
| 9,573,209 | B2 | 2/2017 | Scheibel et al. | |
| 9,643,260 | B2 * | 5/2017 | Lipczynski | B23C 5/10 |
| 9,987,691 | B2 * | 6/2018 | Higashiwaki | B23B 35/00 |
| 10,065,250 | B2 * | 9/2018 | Oguri | B23B 51/10 |
| 10,213,855 | B2 | 2/2019 | Scheibel et al. | |
| 10,610,243 | B2 * | 4/2020 | Sommers | A61B 17/72 |
| 10,744,573 | B2 * | 8/2020 | Scheibel | B23P 19/10 |
| 2008/0206001 | A1 | 8/2008 | Bozkurt | |
| 2014/0050545 | A1 * | 2/2014 | Bailleul | B23B 51/0018 |
| | | | | 408/201 |
| 2015/0202696 | A1 | 7/2015 | Lipczynski et al. | |
| 2020/0108456 | A1 | 4/2020 | Scheibel et al. | |
| 2020/0316694 | A1 * | 10/2020 | Miller | B23B 51/009 |
| 2021/0016370 | A1 * | 1/2021 | Stephenson | B23B 51/06 |
| 2021/0229189 | A1 * | 7/2021 | Yamamoto | B23B 51/009 |

FOREIGN PATENT DOCUMENTS

| | | | |
|---|---|---|---|
| EP | 0936016 A1 | 2/1998 | |
| FR | 2124857 A5 * | 9/1972 | B23B 51/02 |
| JP | 56107815 A * | 8/1981 | B23B 51/009 |
| JP | 08257816 A | 10/1996 | |
| JP | 2014069246 A | 4/2014 | |
| JP | 2017177320 A | 10/2017 | |
| WO | WO200110587 | 2/2001 | |

* cited by examiner

TOOLS AND METHODS FOR FORMING ALIGNED HOLES FROM NEAR FULL-SIZED HOLES

BACKGROUND

Field of the Disclosure

The examples described herein relate to tools and methods for creating a plurality of aligned holes from a plurality of near full-sized holes. The embodiments disclosed herein may reduce a perceived looseness of a tool while forming full-sized holes through two or more parts.

Description of the Related Art

Two or more components may be connected together during the process of forming an assembly. For example, multiple components may be connected together to form an aircraft. Fasteners may be inserted through holes in the two or more components to connect the components together. Holes are formed in each of the components intended to be connected together with the intention of the holes being aligned when the components are brought together. Misalignment of corresponding holes in the components can occur for various reasons including variations and acceptable tolerances in the manufacturing process.

In some instances, the holes formed in each of the components may be initially formed as near full-sized holes. In other words, the holes formed in the components are created with diameters that are smaller than the diameter needed for the insertion of the desired fastener through the corresponding holes. It can be challenging to form corresponding full-sized holes through the components that are also aligned to permit the insertion of the desired fastener through each of the corresponding full-sized holes.

A cutter having a pilot member attached to the cutter may be used for the formation of full-sized holes in two or more parts. The diameter of the pilot member is selected to permit the pilot member to pass through an initial pair of misaligned holes that are aligned or misaligned up to a designated maximum misalignment. The designated maximum misalignment corresponds to highest degree of misalignment between the pair of holes for which the cutter will be able to cut aligned full-size holes through the corresponding parts. As such, there may be a perceived looseness of the tool when the tool is inserted into two or more holes that are misaligned to a degree that is below the maximum misalignment. The perceived looseness potentially increases as the degree the misalignment decreases.

SUMMARY

The present disclosure is directed to tools and methods for creating a plurality of aligned holes from a plurality of near full-sized holes.

One example of the present disclosure is a tool for creating a plurality of aligned full-sized holes from a plurality of near full-sized holes. The tool includes a cutting member having a first diameter and a pilot member connected to the cutting member. The pilot member being coaxial to the cutting member and includes a first section having a centering member and a second section having a second diameter. The first section is positioned between the cutting member and the second section.

The centering member may include a cutting surface. The first diameter is larger than the second diameter. The centering member may be configured to center the pilot member within a first hole of the plurality of near full-sized holes. The centering member may be configured to reduce looseness of the pilot member within a first hole of the plurality of near full-sized holes.

The second diameter may correspond to a positional tolerance of misalignment of the plurality of near full-sized holes and a full-size hole diameter. The plurality of near full-sized holes may include a first hole and a second hole and wherein at least a portion of a boundary of the first hole and at least a portion of a boundary of the second hole may define a clearance gap, the positional tolerance including a width dimension of the clearance gap.

The centering member may have a third diameter, wherein the third diameter and the second diameter are smaller than each diameter of the plurality of near full-sized holes. A dimension of the third diameter may be half of a difference between a dimension of the first diameter and a dimension of the second diameter. The first diameter may be larger than a diameter of any of the plurality of near full-sized holes.

The centering member may include a taper. The taper may have a lower and an upper end. The lower end may have a lower diameter that is substantially equal to the second diameter. The upper end may have an upper diameter that is substantially equal to the first diameter. The taper may be at substantially 10 degrees.

One example of the present disclosure is method for creating a plurality of aligned holes from a plurality of holes. The method includes inserting a pilot member within the plurality of holes, the pilot member includes a first section and a second section. The first section has a centering member. The first section is connected to a cutting member having a first diameter. The second section has a second diameter that is smaller than the first diameter. The first section is positioned between the cutting member and the second section. The second diameter corresponds to a positional tolerance of the plurality of holes and a full-size hole diameter. The method includes cutting through the plurality of holes with the cutting member.

Cutting through the plurality of holes with the cutting member may include forming a plurality of full-sized holes, wherein the plurality of holes are near full-sized holes. Inserting the pilot member within the plurality of holes may include insetting the second section having the second diameter into a first hole of the plurality of holes, wherein the second diameter is smaller than a diameter of each of the plurality of holes. The method may include inserting the first section having the centering member into the first hole of the plurality of holes after inserting the second section into the first hole of the plurality of holes to reduce a perceived looseness of the pilot member, wherein the centering member has a third diameter that is larger than the second diameter of the second section of the pilot member reducing a gap between the pilot member and sidewalls of the first hole of the plurality of holes to reduce the perceived looseness of the pilot member.

The method may include inserting the first section having the centering member into the first hole of the plurality of holes after inserting the second section into the first hole of the plurality of holes to center the pilot member within the first hole of the plurality of holes, the centering member having a constant diameter that is larger than the second diameter and smaller than the first diameter, the constant diameter of the centering member reducing a gap between the pilot member and sidewalls of the first hole of the plurality of holes to center the pilot member within the first hole of the plurality of holes. The method may include inserting the first section having the centering member into the first hole of the plurality of holes after inserting the second section into the first hole of the plurality of holes to center the pilot member within the first hole of the plurality of holes, the centering member having a tapered surface, the tapered surface reduces a gap between the pilot member and sidewalls of the first hole of the plurality of holes to center the pilot member within the first hole of the plurality of holes. The method may include cutting through the plurality of holes by contacting a sidewall of at least one hole of the plurality holes with a cutting surface on the tapered surface of the centering member.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

The embodiments described herein can be used to form a plurality of aligned full-sized holes from a plurality of holes, which may be near full-sized holes. As used herein, a near full-sized hole is a hole within a part or component that is an under sized hole relative to a designated full size, or finished, hole for the insertion of a fastener to connect the part or component to one or more additional parts or components. In other words, the diameter of a near full-sized hole is smaller than the designated diameter of the full-sized hole to accept the requisite or intended fastener. The designated diameter of the full-sized hole will be slightly larger than the diameter of the fastener to be inserted into the full-sized hole. Typically, the full size, or finished hole, will be designated within an engineering specification detailing the assembly of the two or more components.

Figure 1:
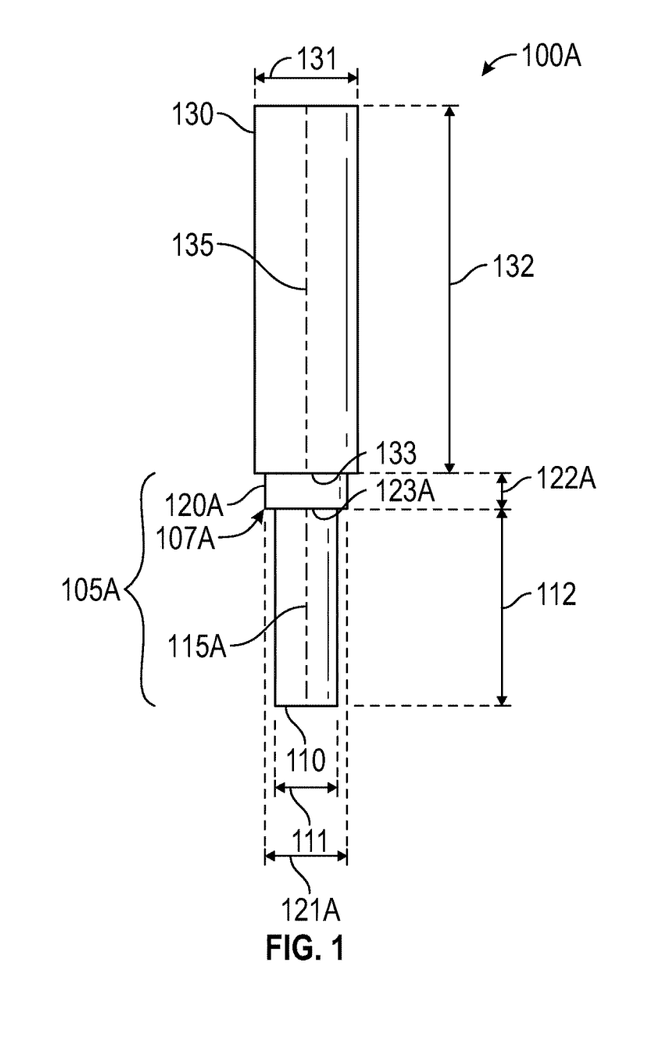
FIG. 1 shows an example of a tool that may be used to form a plurality of aligned full-sized holes from a plurality of holes.

FIG. 1 shows an example of a tool 100A that may be used to form a plurality of aligned full-sized holes from a plurality of holes, which may be near full-sized holes. The tool 100A includes a cutting member 130 and a pilot member 105B. The cutting member 130 has a first diameter 131. The pilot member 105A is connected to the cutting member 130. The pilot member 105A is coaxial to the cutting member 130. For example, the pilot member 105A is coaxial to the cutting member 130 by aligning the centerline 135 of the cutting member 130 with the centerline 115A of the pilot member 105A. The pilot member 105A includes a first section 107A having a centering member 120A and a second section 110 that has a second diameter 111. The first section 107A is positioned between the cutting member 130 and the second section 110.

The first diameter 131 of the cutting member 130 is configured to cut full-sized holes through two or more parts. The cutting member 130 includes a cutting surface 133 to enable the cutting member 130 to cut full-sized holes through two or more parts. The first diameter 131 may be configured to be slightly larger than the diameter of a standard size of fastener or may be slightly larger than the diameter of a designated fastener to be used to connect two or more components together to form an assembly. The first diameter 131 may be the same diameter as the diameter of a standard size of fastener or the same as the diameter of a designated fastener to be used to connect two or more components together to form an assembly. The first diameter 131 is larger than a diameter of any of the plurality of near full-sized holes.

If interference fit fasteners are to be used, the first diameter 131 may be smaller than the diameter of a standard size of fastener or smaller than the diameter of a designated fastener to be used to connect two or more components together to form an assembly. The first diameter 131, which determines the full-sized hole diameter, is a function of the fastener size and the class of fit, namely, clearance, transition, or interference. The cutting member 130 has a first length 132 that is configured to cut through two or more parts for form an aligned full-sized hole. The first diameter 131 of the cutting member 130 is larger than the second diameter 111 of the second section 110 of the pilot member 105A.

The second diameter 111 is configured to be smaller than the diameter of the near full-sized holes into which the pilot member 105A is to be inserted into. The second diameter 111 of the second section 110 of the pilot member 105A may correspond to a positional tolerance of misalignment of a plurality of near full-sized holes and an intended full-size hole diameter. In other words, the second diameter 111 may be configured to correspond to a maximum misalignment between two or more near full-sized holes that will ensure the intended full-sized hole diameter that corresponds to the first diameter 131 of the cutting member 130 will cut a full-sized hole through the parts that fully encompasses the two or more near full-sized holes as discussed herein. The second section 110 of the pilot member 105A has a second length 112. The second length 112 of the second section is configured to enable the second section 110 to pass through the holes in two or more parts as desired. The positional tolerance of misalignment may include a width dimension W2 of a clearance gap C2 of the near full-sized holes.

The first section 107A of the pilot member 105A includes a centering member 120A. The centering member 120A includes a cutting surface 123A. The centering member 120A has a third length 122A and a third diameter 121A. The centering member 120A may be configured to a reduce looseness of the pilot member 105A within a first hole 211 of the near full-sized holes 211, 221. For example, the third diameter 121A may be configured to reduce a perceived looseness of the tool 100A when inserted into two or more near full-sized holes in a plurality of parts. The third diameter 121A is smaller than the first diameter 131 of the cutting member 130 and larger than the second diameter 111 of the second section 110 of the pilot member 105A. The dimension of the third diameter 121A may be half of the difference between the dimension of the first diameter 131 and the dimension of the second diameter 111. The centering member 120A is configured to center the pilot member 105A with the first hole 211 of the plurality of near full-sized holes 211, 221. For example, the third diameter 121A may be configured to center the pilot member 105A within the plurality of holes. The third diameter 121A of the pilot member 105A may be smaller than the diameter of a plurality of near full-sized holes in a plurality of parts to enable the pilot member 105A to be inserted into the plurality of near full-sized holes. The third diameter 121A and the second diameter 111 are smaller than each diameter D1 of the plurality of near full-sized holes 211, 221.

The centering member 120A of the first section 107A of the pilot member 105A may include a cutting surface 123A to enable the centering member 120A to cut through a portion of one or more parts through which a full-sized hole is to be cut. For example, when inserting the pilot member 105A into a pair of misaligned holes, the centering member 120A may be configured to align the tool 100A along a centerline of a first hole, but as the cutting member 130 begins to cut a full-sized hole in the proximal part the centering member 120A may engage a portion of the distal part due to the misalignment of the pair of holes. The cutting surface 123A of the centering member 120A may enable the centering member 120A to cut through the distal part.

Figure 2:
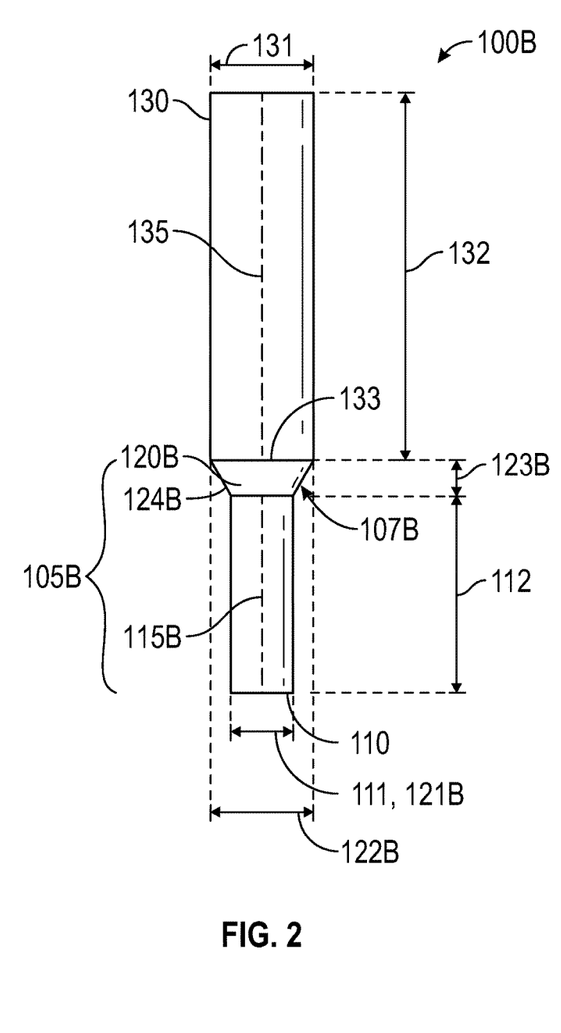
FIG. 2 shows an example of a tool that may be used to form a plurality of aligned full-sized holes from a plurality of holes.

FIG. 2 shows an example of a 100B tool that may be used to form a plurality of aligned full-sized holes from a plurality of holes, which may be near full-sized holes. The tool 100B includes a cutting member 130 and a pilot member 105B. The cutting member 130 has a first diameter 131. The pilot member 105B is connected to the cutting member 130. The pilot member 105B is coaxial to the cutting member 130. For example, the pilot member 105A is coaxial to the cutting member 130 by aligning the centerline 135 of the cutting member 130 with the centerline 115B of the pilot member 105B. The pilot member 105B includes a first section 107B having a centering member 120B and a second section 110 that has a second diameter 111. The first section 107B is positioned between the cutting member 130 and the second section 110.

The first diameter 131 of the cutting member 130 is configured to cut full-sized holes through two or more parts. The cutting member 130 includes a cutting surface 133 to enable the cutting member 130 to cut full-sized holes through two or more parts. The first diameter 131 may be configured to be slightly larger than the diameter of a standard size of fastener or may be slightly larger than the diameter of a designated fastener to be used to connect two or more components together to form an assembly. The first diameter 131 may be the same diameter as the diameter of a standard size of fastener or the same as the diameter of a designated fastener to be used to connect two or more components together to form an assembly. If interference fit fasteners are to be used, the first diameter 131 may be smaller than the diameter of a standard size of fastener or smaller than the diameter of a designated fastener to be used to connect two or more components together to form an assembly. The first diameter 131, which determines the full-sized hole diameter, is a function of the fastener size and the class of fit, namely, clearance, transition, or interference. The cutting member 130 has a first length 132 that is configured to cut through two or more parts for form an aligned full-sized hole. The first diameter 131 of the cutting member 130 is larger than the second diameter 111 of the second section 110 of the pilot member 105B. The first diameter 131 is larger than a diameter of any of the plurality of near full-sized holes.

The second diameter 111 is configured to be smaller than the diameter of the near full-sized holes into which the pilot member 105B is to be inserted into. The second diameter 111 of the second section 110 of the pilot member 105B may correspond to a positional tolerance of misalignment of a plurality of near full-sized holes and an intended full-size hole diameter. In other words, the second diameter 111 may be configured to correspond to a maximum misalignment between two or more near full-sized holes that will ensure the intended full-sized hole diameter that corresponds to the first diameter 131 of the cutting member 130 will cut a full-sized hole through the parts that fully encompasses the two or more near full-sized holes as discussed herein. The second section 110 of the pilot member 105B has a second length 112. The second length 112 of the second section is configured to enable the second section 110 to pass through the holes in two or more parts as desired.

The first section 107B of the pilot member 105B includes a centering member 120B. The centering member 120B includes a cutting surface 124B. The centering member 120B has a third length 123B. The centering member 120B comprises a taper. The centering member 120B is tapered from a lower end to an upper end. At the lower end, the centering member 120B has a lower diameter 121B, which may be substantially equal to the second diameter 111 of the second section 110 of the pilot member 105B. At the upper end, the centering member 120B has an upper diameter 1228, which may be substantially equal to the first diameter 131 of the cutting member 130. The centering member 120B is configured to reduce a looseness of the pilot member 105B within the first hole 211 of the near full-sized holes 211, 221. For example, the taper of the centering member 120B may be configured to reduce a perceived looseness of the tool when inserted into two or more near full-sized holes in a plurality of parts. The taper may be at substantially 10 degrees. The lower diameter 121B is smaller than the upper diameter 122B. The centering member 120B is configured to center the pilot member 105B within the first hole 211 of the plurality of near full-sized holes 211, 221. For example, the taper of the centering member 120B may be configured to center the pilot member 105B within the plurality of holes.

The centering member 120B of the first section 107B of the pilot member 105B may include a cutting surface 124B to enable the centering member 120B to cut through a portion of one or more parts through which a full-sized hole is to be cut. For example, when inserting the pilot member 105B into a proximal hole in a two or more parts, a portion of the taper of the centering member 120B will engage the part before the pilot member 105B is completely inserted through holes through the parts to be connected. The cutting surface 124B of the centering member 120B enables the tool 100A to begin cutting through the proximal part until the cutting surface 133 of the cutting member 130 engages the proximal part. The taper of the centering member 120B is configured to align the tool 100B along a centerline of a proximal hole of two or more near full-sized holes through which full-sized holes are be formed.

Figure 3:
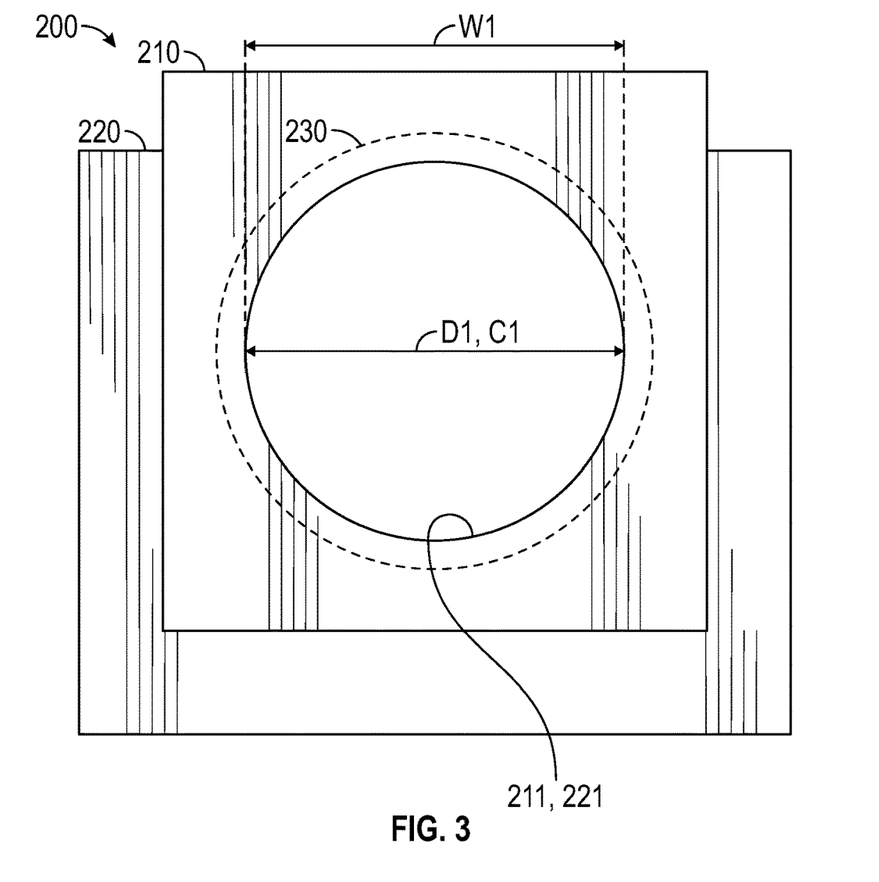
FIG. 3 is a schematic of two parts each having a near full-sized hole with the near full-sized holes being aligned.

FIG. 3 is a schematic of a system 200 having a first part 210 with a first near full-sized hole 211 and a second part 220 with a second near full-sized hole 221 collectively referred to as near full-sized holes 211, 221 with the near full-sized holes 211, 221 being aligned. The two near full-sized holes 211, 221 each have a diameter D1, which is smaller than the diameter 230 of an intended full-size hole. As the two near full-sized holes 211, 221 are aligned, the diameter D1 of each of the two near full-sized holes 211, 221 is also identical to the clearance gap C1 through the two near full-sized holes 211, 221. The positional tolerance of misalignment may include a width dimension W1 of a clearance gap C1 through the two near full-sized holes 211, 221. The clearance gap through two or more near full-sized holes will decrease as to the degree of misalignment between the two holes increases. Although the two holes 211, 221 are aligned, the two holes 211, 221 are near full-sized holes and a cutting tool, such as tool 100A of FIG. 1 or tool 100B or FIG. 2, will need to be used to enlarge the two near full-sized holes to two aligned full-sized holes.

The pilot member 105A, 105B may be inserted into the two near full-sized holes 211, 221 with the centering members 120A, 120B configured to align the tool 100A, 100B enable the cutting member 130 to cut full-sized aligned holes through the two parts 210, 220. As discussed herein, the first diameter 131 of the cutting member 130 corresponds to the diameter 230 of the intended full-size hole to enable the desired fastener to be inserted through the parts 210, 220 to couple the parts 210, 220 together. The number, size, location, shape, and/or configuration of the parts 210, 220, full-size diameter 230, diameter D1, clearance gap C1, and holes 211, 221 in FIG. 3 are shown for illustrative purposes and may be varied depending on the application.

Figure 4:
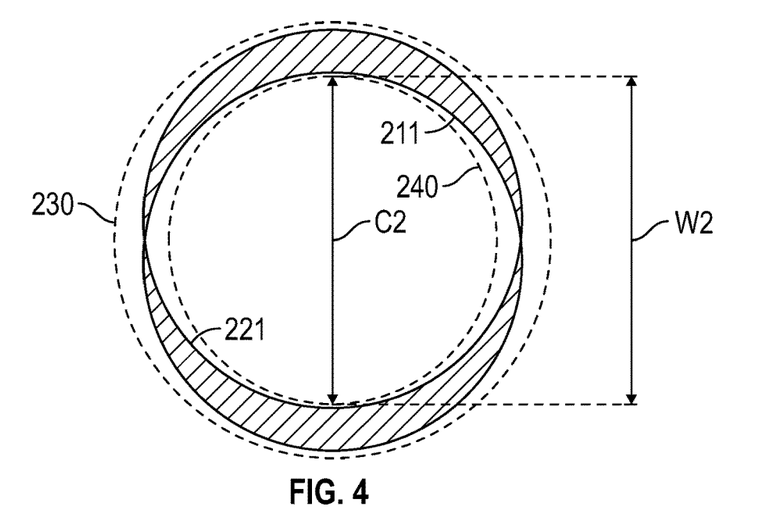
FIG. 4 is a schematic showing two near full-sized holes that are misaligned.

FIG. 4 is a schematic showing two near full-sized holes 211, 221 that are misaligned. The parts are not included in the schematic for clarity purposes. The two near full-size holes 211, 221 resulting in a clearance gap C2 that is smaller than diameters of the two near full-sized holes 211, 221. The clearance gap C2 results in a virtual hole diameter 240 through the two misaligned near full-sized holes 211, 221. When the two near full-sized holes are at a predetermined maximum misalignment the clearance gap C2 will be the smallest value possible that still enables the passage of the second section 110 of the pilot member 105A, 105B through the two near full-sized holes 211, 211 and that the first diameter 131 of the cutting member 130 to fully encompass both holes 211, 221. As shown in FIG. 4, a portion of the boundary of the first hole 211 and a portion of the boundary of the second hole 221 define the clearance gap C2. At the maximum misalignment between the two holes 211, 221, the positional tolerance that corresponds to the second diameter 111 corresponds to the width dimension of the clearance gap C2.

Figure 5A:
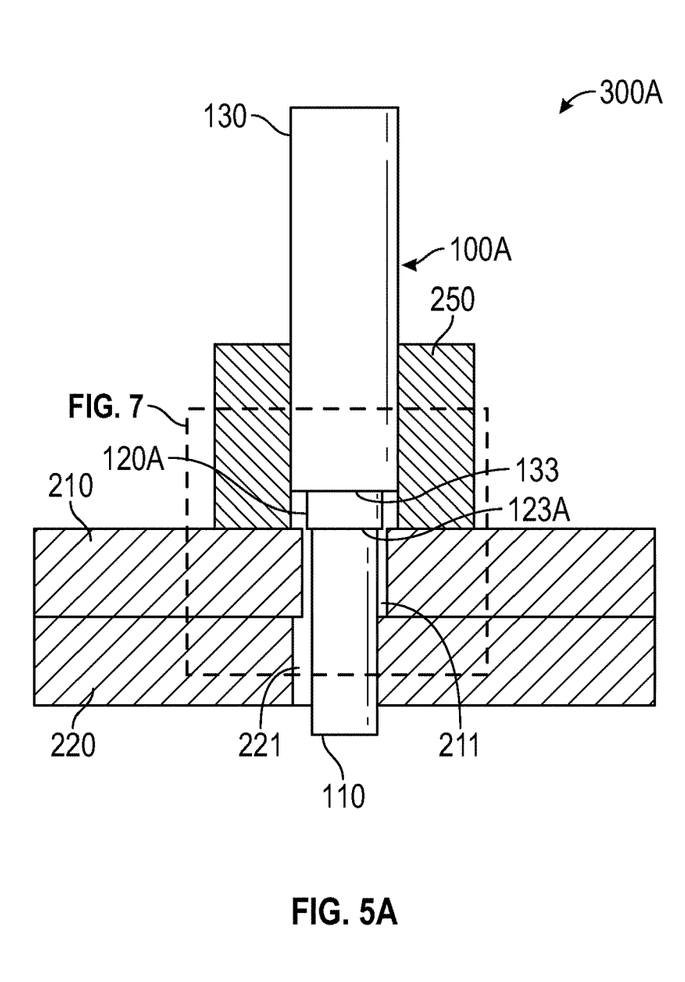
FIGS. 5A-5C are side view schematics showing a tool used to form an aligned till-sized hole in two parts having misaligned holes.
Figure 5B:
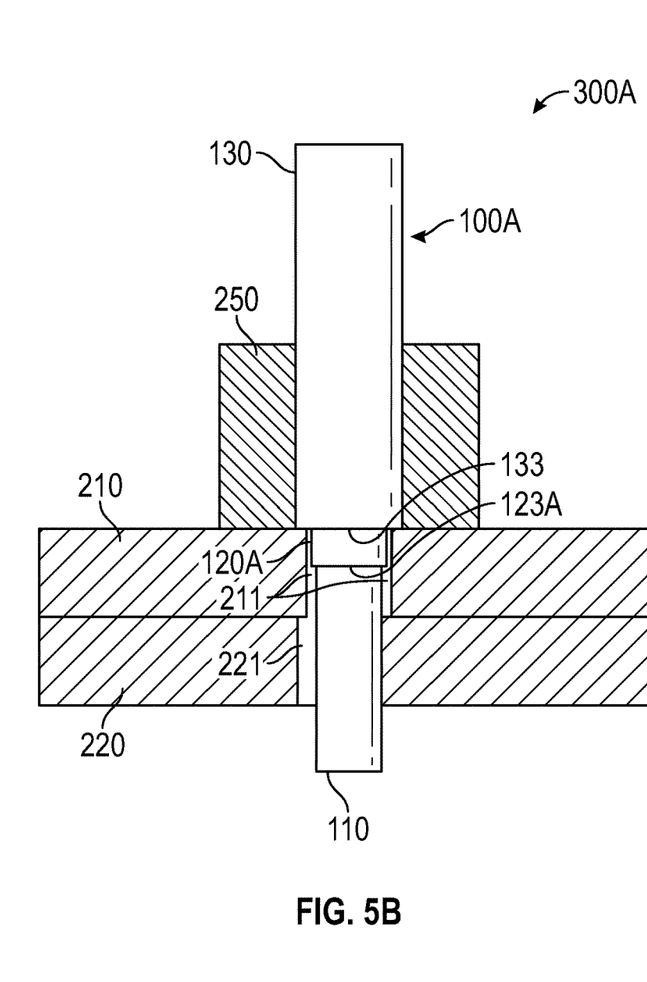
Figure 5C:
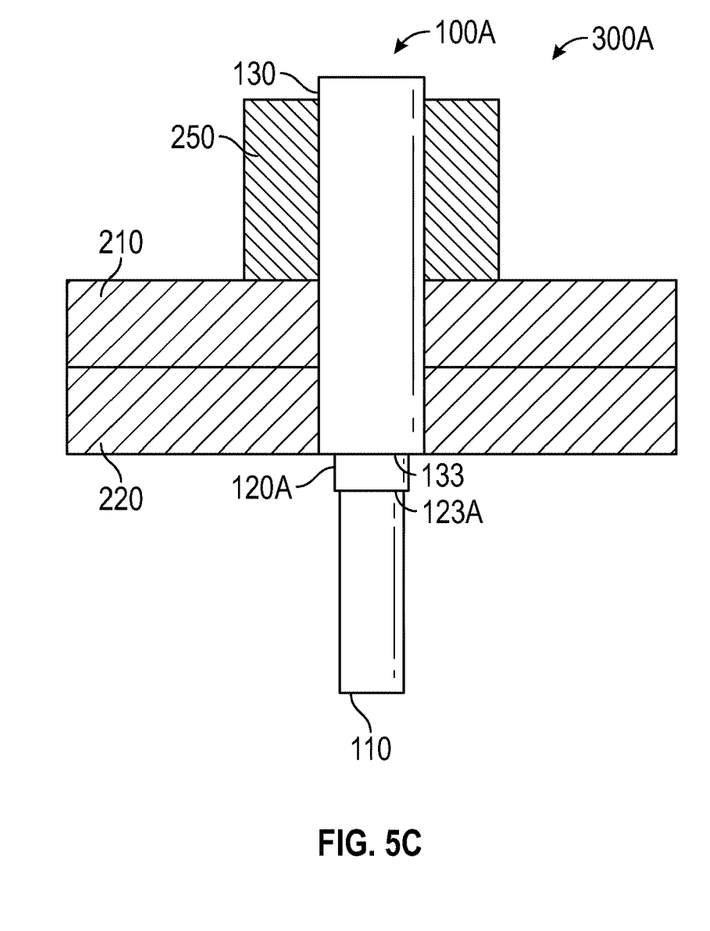

FIGS. 5A-5C are side view schematics showing a system 300A that includes a tool 100A used to form an aligned full-sized hole in two parts 210, 220 having two near full-sized misaligned holes 211, 221. FIG. 5A shows the second section 110 of the pilot member 105A positioned within the two near full-sized misaligned holes 211, 221. A guide block 250 may be positioned on top of one part 210 to guide the tool 100A to position the second section 110 within the two near full-sized misaligned holes 211, 221. The second diameter 111 of the second section 110 of the pilot member 105A is configured to correspond to a positional tolerance to ensure that the tool 100A will be able to cut a full-size hole through the parts 210, 220 that encompasses both of the misaligned near full-sized holes 211, 221. The tool 100A will not be able to form two aligned full-sized holes if the second section 110 of the pilot member 105A of the tool 100A is unable to pass through both of the misaligned near full-sized holes 211, 221. Two parts 210, 220 having two near full-sized holes 211, 221 is shown in FIGS. 5A-5C for illustrative purposes and may be varied depending on the application.

FIG. 5B shows the centering member 120A of the tool 100A positioned within the proximal near full-sized hole 221. The third diameter 121A may be configured to center the tool 100A within the proximal near full-sized hole 221. The third diameter 121A may be configured to reduce any perceived looseness of the tool 100A as it is inserted through the two near full-sized holes 211, 221. For example, the third diameter 121A may be half of the difference between the second diameter 111 of the second section 110 of the pilot member 105A and the first diameter 131 of the cutting member 130. Alternatively, the third diameter 121A may be half of the difference between the second diameter 111 of the second section 110 of the pilot member 105A and the diameter of the proximal near full-sized hole 221. As the centering member 120A has a cutting surface 123A, the third diameter 121A may be any diameter between the first diameter 131 and the second diameter 111. FIG. 5C shows the cutting member 130 inserted through both the proximal part 210 and the distal part 220 to cut two full-size aligned holes in the parts 210, 220.

Figure 6A:
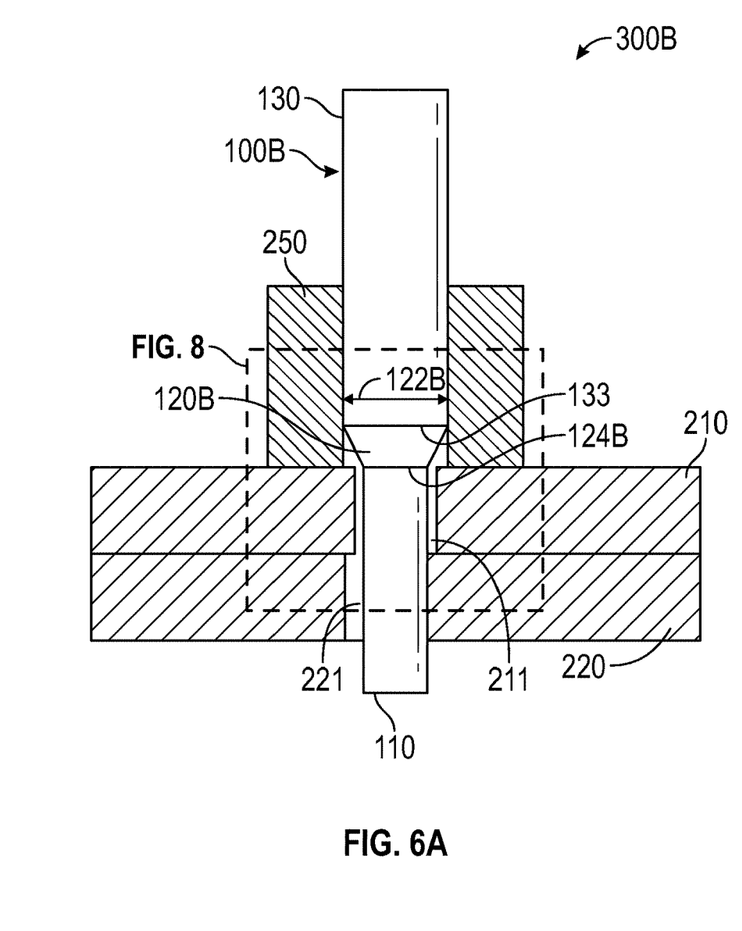
FIGS. 6A-6C are side view schematics showing a tool used to form an aligned full-sized hole in two parts having misaligned near full-sized holes.
Figure 6B:
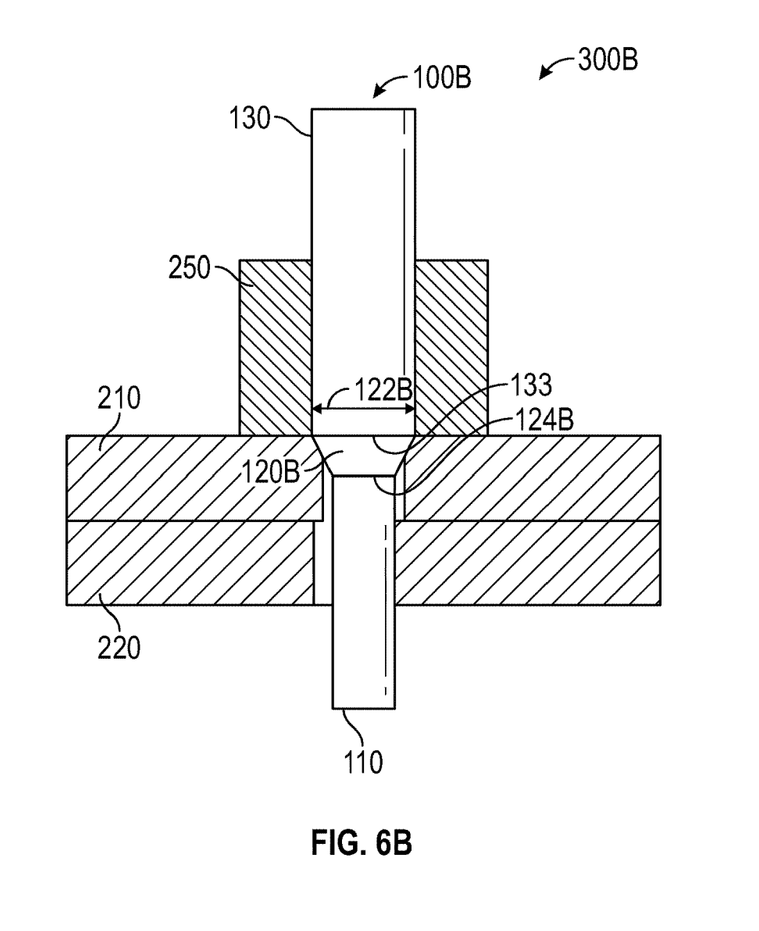
Figure 6C:
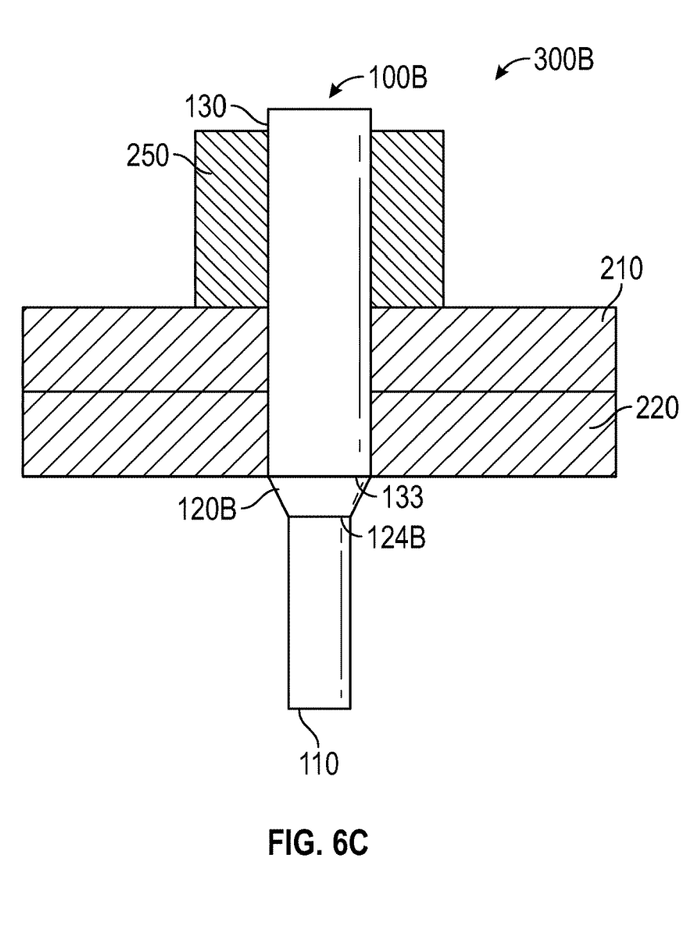

FIGS. 6A-6C are side view schematics showing a system 300B that includes a tool 100B used to form an aligned full-sized hole in two parts 210, 220 having two near full-sized misaligned holes 211, 221. FIG. 6A shows the second section 110 of the pilot member 105B positioned within the two misaligned near full-sized holes 211, 221. A guide block 250 may be positioned on top of one part 210 to guide the tool 100B to position the second section 110 within the two near full-sized misaligned holes 211, 221. The second diameter 111 of the second section 110 of the pilot member 105B is configured to correspond to a positional tolerance to ensure that the tool 100B will be able to cut a full-size hole through the parts 210, 220 that encompasses both of the misaligned near full-sized holes 211, 221. The tool 100B will not be able to form two aligned full-sized holes if the second section 110 of the pilot member 105B of the tool 100B is unable to pass through both of the misaligned near full-sized holes 211, 221. Two parts 210, 220 having two near full-sized holes 211, 221 is shown in FIGS. 6A-6C for illustrative purposes and may be varied depending on the application.

FIG. 6B shows the centering member 120B of the tool 100B positioned within a portion of the proximal near full-sized hole 221. As discussed herein, the centering member 120B is tapered and the taper may be configured to center the tool 100B within the proximal near full-sized hole 221. The taper of the centering member 120B may be configured to reduce any perceived looseness of the tool 100B as it is inserted through the two near full-sized holes 211, 221. The centering member 120B includes a cutting surface 124B to enable the centering member 120B to cut through a portion of the parts 210, 220 as the tool 100B is inserted through the holes 211, 221. FIG. 6C shows the cutting member 130 inserted through both the proximal part 210 and the distal part 220 to cut two full-size aligned holes in the parts 210, 220.

Figure 7:
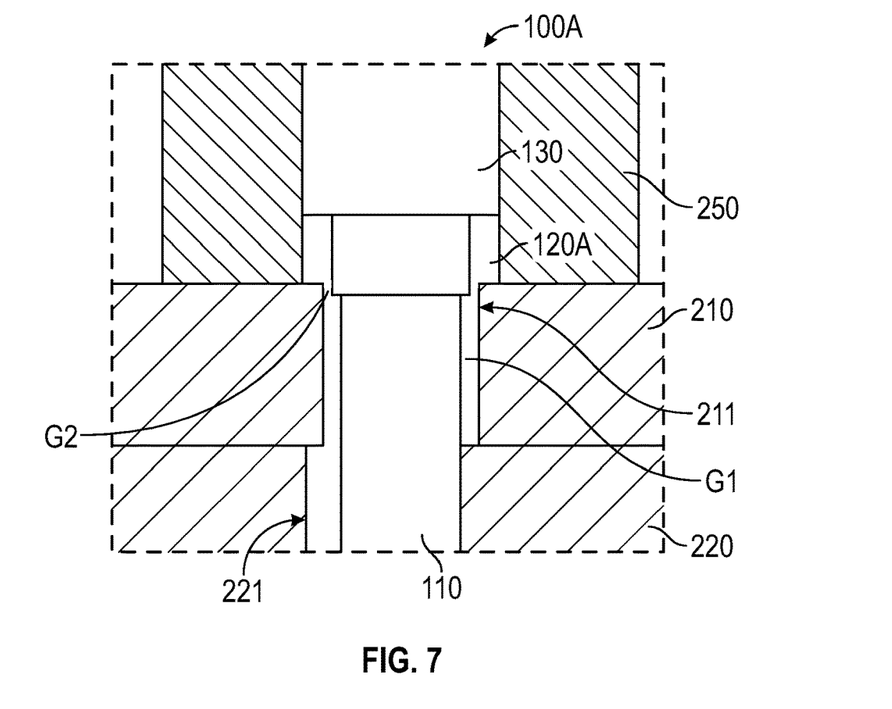
FIG. 7 is a closeup view showing a tool positioned within misaligned near full-sized holes.

FIG. 7 shows a close-up view of FIG. 5A with the second section 110 of the pilot member 105A positioned within the two misaligned near full-sized holes 211, 221. The second section 110 of the pilot member 105A creates a first gap G1 between the second section 110 and the proximal hole 211. The centering member 120A is configured to create a second gap G2 that is smaller than the first gap G1 between the second section 110 and the proximal hole 211. The centering member 120A reduces a perceive looseness of the tool 100A and/or may center the tool 100A within the proximal hole 211.

Figure 8:
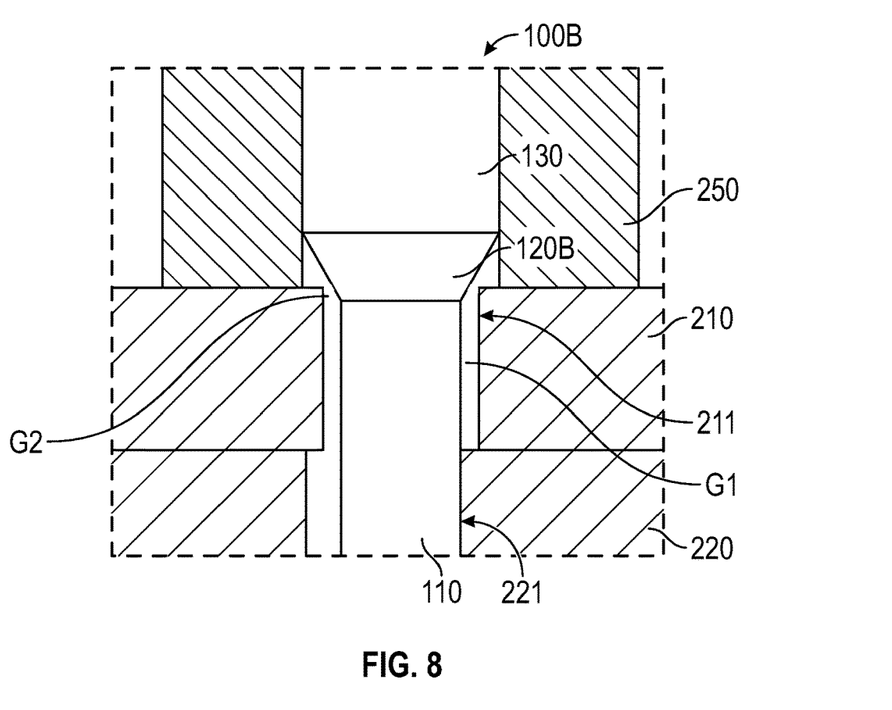
FIG. 8 is a closeup view showing a tool positioned within misaligned near full-sized holes.

FIG. 8 shows a close-up view of FIG. 6A with the second section 110 of the pilot member 105B positioned within the two misaligned near full-sized holes 211, 221. The second section 110 of the pilot member 105B creates a first gap G1 between the second section 110 and the proximal hole 211. The centering member 120B is configured to create a second gap G2 that is smaller than the first gap G1 between the second section 110 and the proximal hole 211 when the taper of the centering member 120B engages the proximal first part 210. The taper of the centering member 120B is configured to reduce a perceive looseness of the tool 100B and/or may center the tool 100B within the proximal hole 211.

Figure 9:
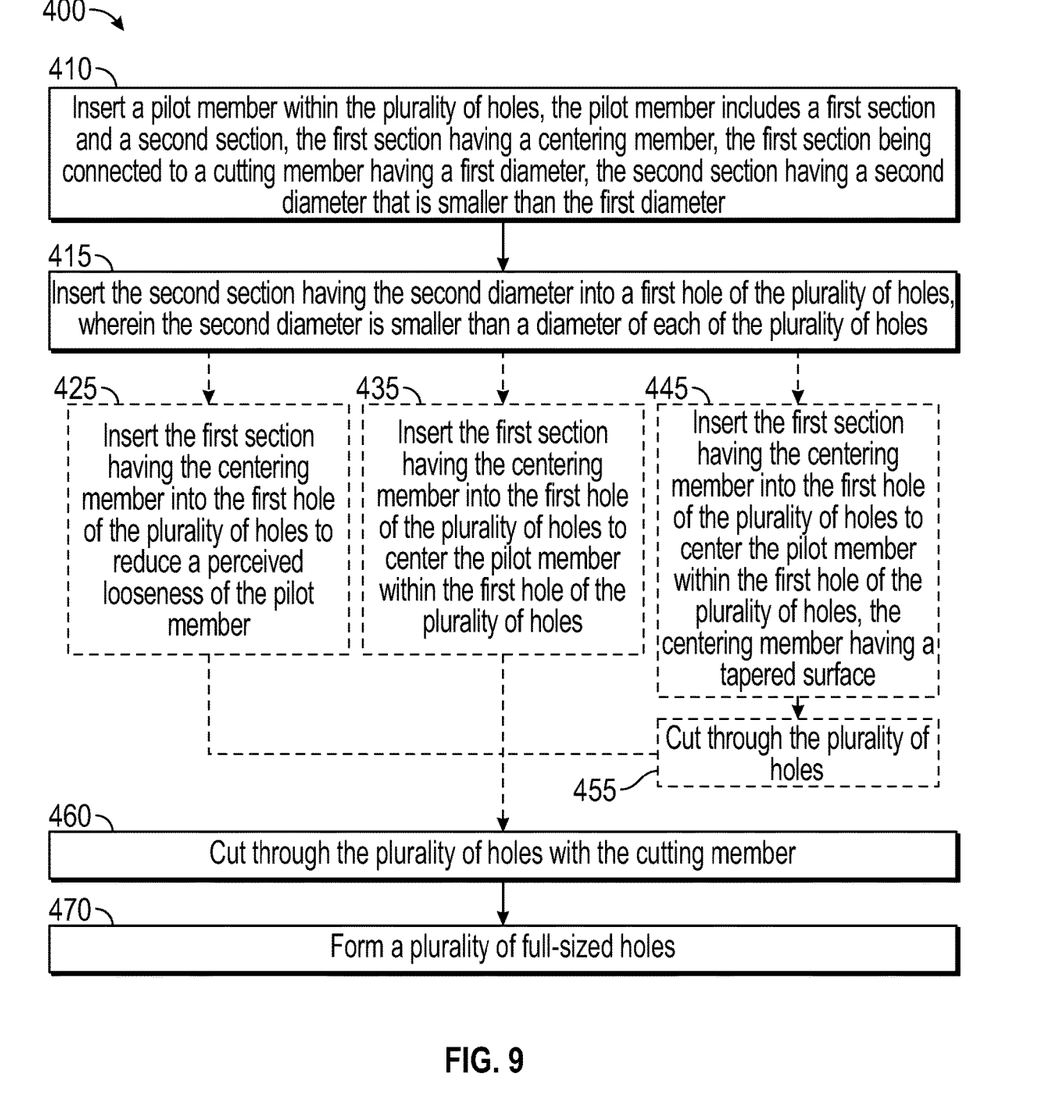
FIG. 9 is a flow chart of an example of a method for creating a plurality of aligned holes from a plurality of holes.

FIG. 9 is a flow chart of an example of a method 400 for creating a plurality of aligned holes from a plurality of holes. The method 400 includes inserting a pilot member within a plurality of holes, at 410. The pilot member includes a first section and a second section, the first section having a centering member. The first section being connected to a cutting member having a first diameter and the second section having a second diameter that is smaller than the first diameter. The first section is positioned between the cutting member and the second section and the second diameter corresponds to a positional tolerance of the plurality of holes and a full-size hole diameter. For example, a second section 110 of a pilot member 105A, 105B of a tool 100A, 100B is inserted into a plurality of holes 211, 221.

The method 400 includes inserting the second section having the second diameter into a first hole of the plurality of holes, wherein the second diameter is smaller than a diameter of each of the plurality of holes, at step 415. The method 400 includes cutting through the plurality of holes with the cutting member, at 460. For example, the cutting member 130 of the tools 100A, 100B cut through the plurality of holes 211, 221 in a plurality of parts 210, 220. The method 400 includes forming a plurality of full-sized holes, at 470. For example, cutting through the plurality of holes with the cutting member 130 further comprises forming a plurality of full-sized holes, wherein the plurality of holes 211, 221 are near full-sized holes full-sized holes.

After inserting the second section into the first hole, the method 400 may include inserting the first section having the centering member into the first hole of the plurality of holes to reduce a perceived looseness of the pilot member, at 425. For example, after inserting the second section into the first hole of the plurality of holes of the first section of the pilot member may be inserted. The first section of the pilot member includes a centering member that has a third diameter that is larger than the second diameter of the second section of the pilot member. The larger diameter of the centering member reduces a gap between the pilot member and sidewalls of the first hole of the plurality of holes to reduce the perceived looseness of the pilot member. Alternatively, the method 400 may include inserting the first section having the centering member into the first hole of the plurality of holes to center the pilot member within the first hole of the plurality of holes, at 435. For example, the centering member may have a constant diameter that is larger than the second diameter and smaller than the first diameter. The constant diameter of the centering member reduces a gap between the pilot member and sidewalls of the first hole of the plurality of holes to center the pilot member within the first hole of the plurality of holes.

The method 400 may include inserting the first section having the centering member into the first hole of the plurality of holes to center the pilot member within the first hole of the plurality of holes, the centering member having a tapered surface, at 445. For example, the tapered surface may reduce a gap between the pilot member within the first hole of the plurality of holes. The method 400 may include cutting through the plurality of holes, at 455. For example, the tool may cut through the plurality of holes by contacting a sidewall of at least one hole of the plurality holes with a cutting surface on the tapered surface of the centering member.

Although this disclosure has been described in terms of certain embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A tool for creating a plurality of aligned full-sized holes from a plurality of near full-sized holes, the tool comprising:
   a cutting member having a first diameter;
   a pilot member connected to the cutting member, the pilot member being coaxial to the cutting member, the pilot member includes a first section having a centering member having a first length and a second section having a second diameter and a second length, the first section is positioned between the cutting member and the second section, wherein the second diameter is a constant diameter over the second length and wherein the second length is longer than the first length; and
   wherein the second diameter corresponds to a positional tolerance of misalignment of the plurality of near full-sized holes and a full-size hole diameter.

2. The tool of claim 1, wherein the centering member comprises a cutting surface.

3. The tool of claim 1, wherein the first diameter is larger than the second diameter.

4. The tool of claim 1, wherein the centering member is configured to center the pilot member within a first hole of the plurality of near full-sized holes.

5. The tool of claim 1, wherein the centering member is configured to reduce looseness of the pilot member within a first hole of the plurality of near full-sized holes.

6. The tool of claim 1, wherein the plurality of near full-sized holes includes a first hole and a second hole and wherein at least a portion of a boundary of the first hole and at least a portion of a boundary of the second hole define a clearance gap, the positional tolerance of misalignment including a width dimension of the clearance gap.

7. The tool of claim 6, the centering member having a third diameter, wherein the third diameter and the second diameter are smaller than each diameter of the plurality of near full-sized holes.

8. The tool of claim 7, wherein a dimension of the third diameter is half of a difference between a dimension of the first diameter and a dimension of the second diameter.

9. The tool of claim 7, wherein the first diameter is larger than a diameter of any of the plurality of near full-sized holes.

10. The tool of claim 6, wherein the centering member comprises a taper.

11. The tool of claim 10, wherein the taper has a lower end and an upper end, the lower end having a lower diameter that is substantially equal to the second diameter and the upper end having an upper diameter that is substantially equal to the first diameter.

12. The tool of claim 11, wherein the taper is at substantially 10 degrees.

13. The tool of claim 1, the second section of the pilot member having an end positioned opposite the first section of the pilot member, the end of the second section being flat.

14. A method for creating a plurality of aligned holes from a plurality of holes, the method comprising:
   inserting a pilot member within the plurality of holes, the pilot member includes a first section and a second section, the first section having a centering member, the first section being connected to a cutting member having a first diameter and a first length, the second section having a second diameter that is smaller than the first diameter and having a second length that is longer than the first length, wherein the first section is positioned between the cutting member and the second section and wherein the second diameter corresponds to a positional tolerance of the plurality of holes and a full-size hole diameter, wherein the pilot member is coaxial to the cutting member and wherein the second diameter is a constant diameter over the second length; and
   cutting through the plurality of holes with the cutting member.

15. The method of claim 14, wherein cutting through the plurality of holes with the cutting member further comprises forming a plurality of full-sized holes, wherein the plurality of holes are near full-sized holes.

16. The method of claim 14, wherein inserting the pilot member within the plurality of holes further comprises inserting the second section having the second diameter into a first hole of the plurality of holes, wherein the second diameter is smaller than a diameter of each of the plurality of holes.

17. The method of claim 16, further comprising inserting the first section having the centering member into the first hole of the plurality of holes after inserting the second section into the first hole of the plurality of holes to reduce a perceived looseness of the pilot member, wherein the centering member has a third diameter that is larger than the second diameter of the second section of the pilot member reducing a gap between the pilot member and sidewalls of the first hole of the plurality of holes to reduce the perceived looseness of the pilot member.

18. The method of claim 16, further comprising inserting the first section having the centering member into the first hole of the plurality of holes after inserting the second section into the first hole of the plurality of holes to center the pilot member within the first hole of the plurality of holes, the centering member having a constant diameter that is larger than the second diameter and smaller than the first diameter, the constant diameter of the centering member reducing a gap between the pilot member and sidewalls of the first hole of the plurality of holes to center the pilot member within the first hole of the plurality of holes.

19. The method of claim 16, further comprising inserting the first section having the centering member into the first hole of the plurality of holes after inserting the second section into the first hole of the plurality of holes to center the pilot member within the first hole of the plurality of holes, the centering member having a tapered surface, the tapered surface reduces a gap between the pilot member and sidewalls of the first hole of the plurality of holes to center the pilot member within the first hole of the plurality of holes.

20. The method of claim 19, further comprising cutting through the plurality of holes by contacting a sidewall of at least one hole of the plurality holes with a cutting surface on the tapered surface of the centering member.

* * * * *